United States Patent
Kamasuka

(10) Patent No.: US 10,291,799 B2
(45) Date of Patent: May 14, 2019

(54) INFORMATION PROCESSING APPARATUS CAPABLE OF COMMUNICATING WITH A MOBILE TERMINAL AND CONTROL METHOD THEREFOR

(71) Applicant: CANON KABUSHIKI KAISHA, Tokyo (JP)

(72) Inventor: Atsushi Kamasuka, Matsudo (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 15/802,144

(22) Filed: Nov. 2, 2017

(65) Prior Publication Data
US 2018/0131824 A1   May 10, 2018

(30) Foreign Application Priority Data
Nov. 8, 2016   (JP) .................. 2016-218192

(51) Int. Cl.
   *H04N 1/00*   (2006.01)
   *H04N 1/44*   (2006.01)
   *H04M 1/725*  (2006.01)
   *H04W 4/02*   (2018.01)

(52) U.S. Cl.
   CPC ..... *H04N 1/00411* (2013.01); *H04N 1/00037* (2013.01); *H04N 1/4433* (2013.01); *H04M 1/7253* (2013.01); *H04N 2201/0094* (2013.01); *H04W 4/023* (2013.01)

(58) Field of Classification Search
   None
   See application file for complete search history.

(56) References Cited

U.S. PATENT DOCUMENTS

| 2013/0016376 | A1* | 1/2013 | Hashidume | G03G 21/00 358/1.9 |
| 2015/0378296 | A1* | 12/2015 | Kim | G03G 15/5091 399/80 |
| 2016/0054962 | A1* | 2/2016 | Park | G06F 3/1236 358/1.15 |

FOREIGN PATENT DOCUMENTS

JP   2016-57829 A   4/2016

* cited by examiner

*Primary Examiner* — Thomas D Lee
(74) *Attorney, Agent, or Firm* — Canon USA Inc., IP Division

(57) ABSTRACT

An information processing apparatus includes an operation unit, a storage unit that stores information in a mobile terminal that was successfully authenticated, a memory device that stores a set of instructions, and at least one processor that executes the set of instructions to cause, in a case where a distance between the mobile terminal and the information processing apparatus is within a set range, a screen of the operation unit to transition to a state where the information processing apparatus is usable by a user of the mobile terminal based on the information on the mobile terminal.

19 Claims, 10 Drawing Sheets

FIG. 2
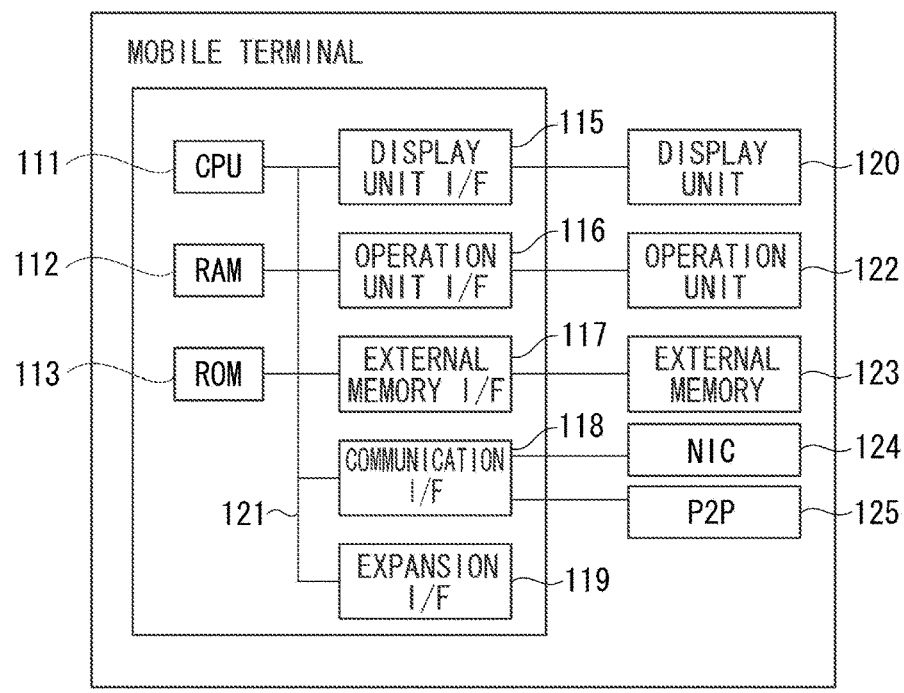
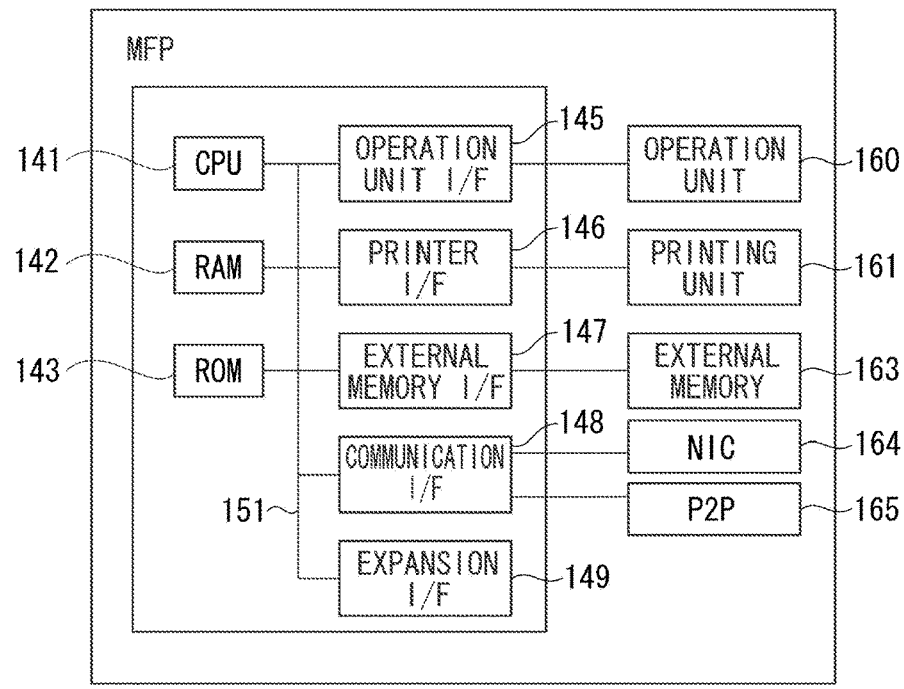

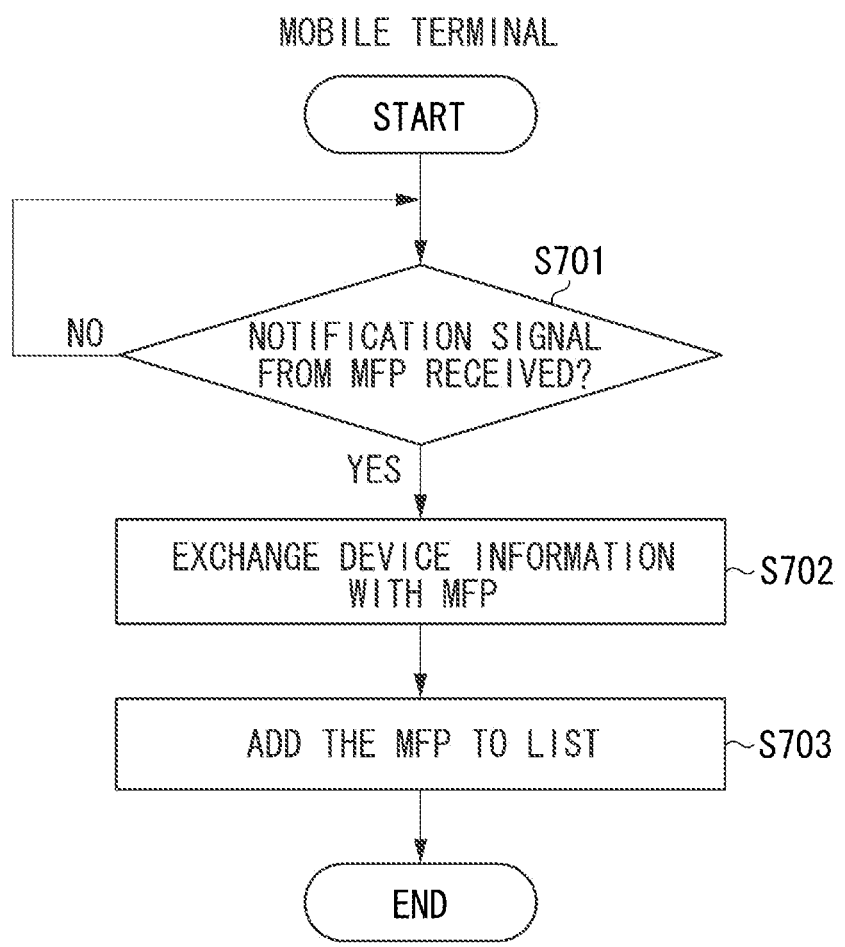

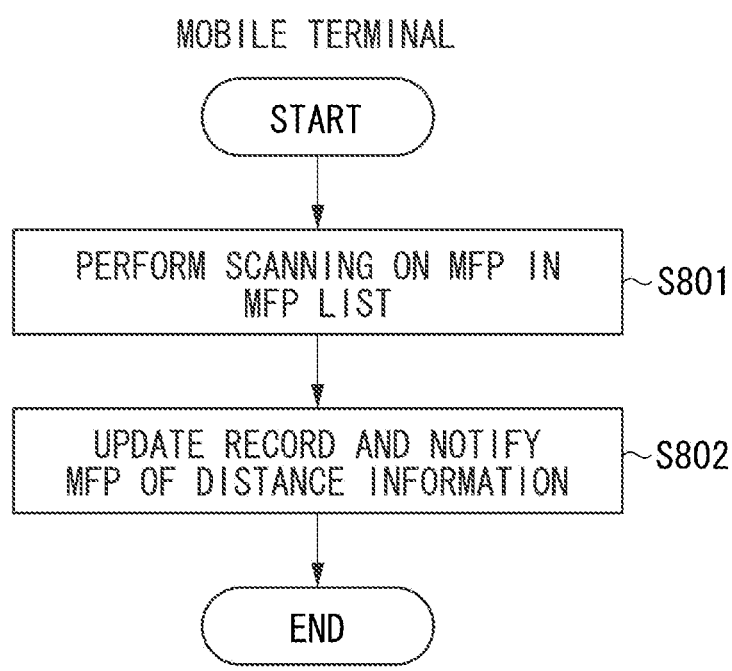

INFORMATION PROCESSING APPARATUS CAPABLE OF COMMUNICATING WITH A MOBILE TERMINAL AND CONTROL METHOD THEREFOR

BACKGROUND

Field of the Invention

The present disclosure relates to an information processing apparatus, an information processing method, and a storage medium.

Description of the Related Art

Techniques for using a mobile terminal to perform printing with a multifunction peripheral (MFP) or a printer within a close range have been available. Such a mobile terminal employs a technique for short-range communications, enabling data exchange with corresponding devices.

Techniques utilizing Bluetooth® Low Energy, enabling relatively long range communications with low power consumption, to identify a position of a device, measure a position, and measure a distance have been developed. For example, positional relationship can be measured with a transmitter broadcasting a signal, including device information, using Bluetooth low energy and with a receiver, in a signal receivable range, receiving the signal and identifying the transmitter. Japanese Patent Application Laid-Open No. 2016-57829 discusses a printing system employing this technique to output a printed material without making a user wait. In an example described below, authentication is performed on a user with a Bluetooth low energy communication signal including identification information of the user's terminal, and a successfully authenticated user is permitted to log into a multifunction peripheral (MFP). In an environment such as an office including a plurality of MFPs, a communication distance set to be long, with a sensitivity of a signal set to be high, is not preferable because more MFPs could be detected than necessary. For example, when the environment is set to enable automatic login, one user might log into a plurality of MFPs. This hinders the use by other users, and is not preferable in terms of security. Such a condition can be avoided by setting the communication distance to be short. This setting, however, can result in frequent failure to detect the user until the user is in proximity to the MFP. Thus, the setting requires the user to wait until login processing completes, and thus results in low usability.

SUMMARY

An information processing apparatus according to an exemplary embodiment includes an operation unit, a storage unit that stores information in a mobile terminal that was successfully authenticated, a memory device that stores a set of instructions, and at least one processor that executes the set of instructions to cause, in a case where a distance between the mobile terminal and the information processing apparatus is within a set range, a screen of the operation unit to transition to a state where the information processing apparatus is usable by a user of the mobile terminal based on the information on the mobile terminal.

Further features of the present disclosure will become apparent from the following description of exemplary embodiments with reference to the attached drawings.

BRIEF DESCRIPTION OF THE DRAWINGS

FIG. 2 is a diagram illustrating an example of hardware configurations of the mobile terminal and the MFP.

FIG. 9 is a flowchart illustrating a flow of information processing executed by the mobile terminal.

FIG. 10 is a flowchart illustrating a flow of information processing executed by the mobile terminal.

DESCRIPTION OF THE EMBODIMENTS

An exemplary embodiment is described below with reference to the drawings.

Figure 1:
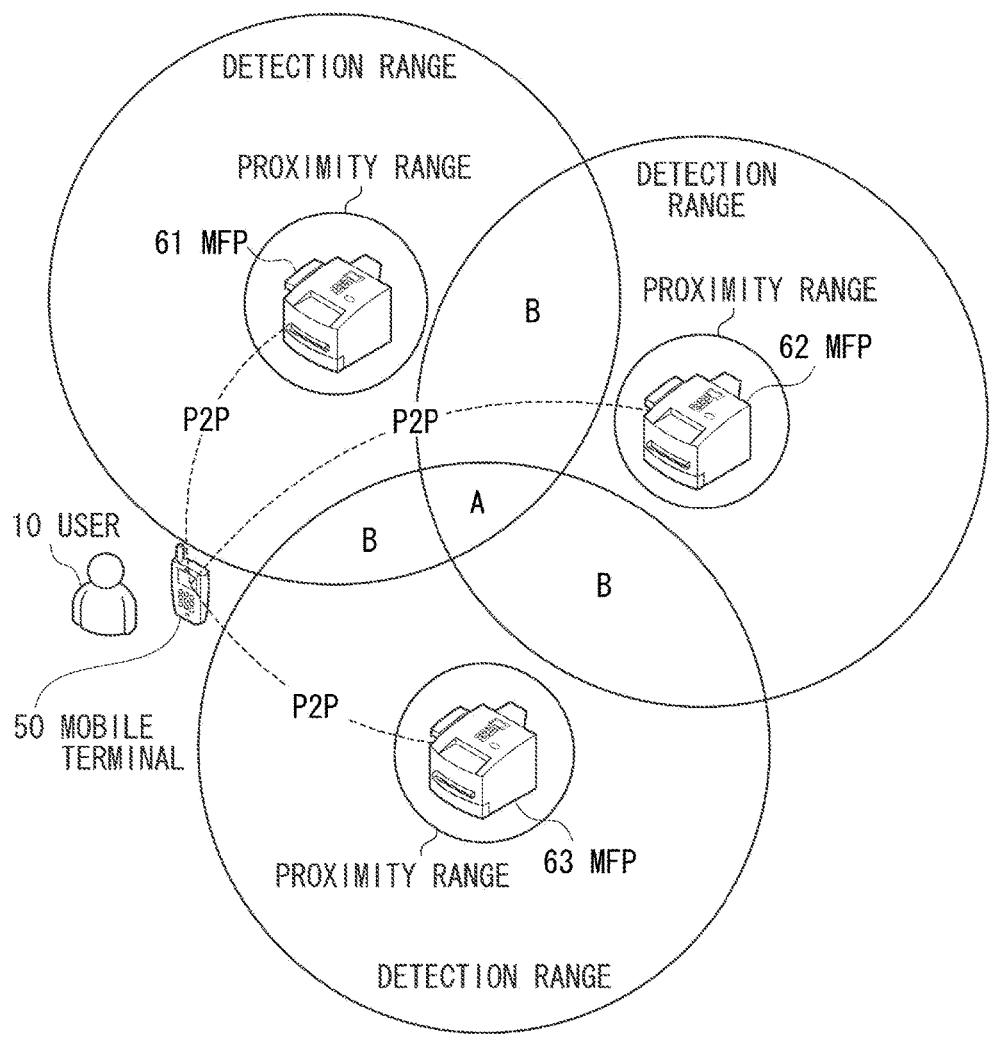
FIG. 1 is a diagram illustrating relationship among a multifunction peripheral (MFP), a mobile terminal, and a user.

FIG. 1 is a diagram illustrating an example of a relationship among multifunction peripherals (MFPs) 61, 62, and 63, a mobile terminal 50, and a user 10. The MFPs 61, 62, and 63 are each examples of an information processing apparatus. The mobile terminal 50 is an example of a portable terminal.

FIG. 1 illustrates a situation where the user 10, holding the mobile terminal 50, such as a smartphone, is walking toward the MFP 62 the user 10 desires to use. Each of the MFPs 61, 62, and 63 transmit a notification signal (beacon). Identification information for each of the MFPs 61, 62, and 63 is stored in the mobile terminal 50 in advance. In response to the beacon, the mobile terminal 50 transmits a response signal, including the identification information, to the MFP 62 and the MFP 62 performs matching (authentication) processing. When the matching (authentication) processing succeeds and the mobile terminal 50 notifies the MFP 62 of distance information indicating a given distance or shorter between the mobile terminal 50 and the MFP 62, the MFP 62 enables the user 10 to automatically login based on a status corresponding to the successful authentication result, which was stored in advance. Thus, the MFP 62 becomes usable by the user 10. The mobile terminal 50 includes a peer-to-peer (P2P) communication module for executing the above-described processing through P2P communications with the MFP 62 installed therein. The P2P communications include wireless communications using Bluetooth® or the like, near field wireless communications, such as Near Field Communication (NFC), and infrared communications.

An outer one of concentric circles around each of the MFPS 61, 62, and 63 indicates a range (detection range) where the notification signal, transmitted by the P2P communication module of the MFPs 61, 62, and 63, is reachable and communications can be performed with the P2P communication module of the mobile terminal 50.

FIG. 1 illustrates an example of an office environment including the mobile terminal 50 and MFPs 61, 62, and 63. When the detection range is set to be large in such an environment, the mobile terminal 50 detects the MFP 61 and the MFP 63 that are not the desired MFP 62, which is the user 10 intends to use. The mobile terminal 50, which has entered areas A and B in FIG. 1, where the detection ranges overlap, may concurrently detect a plurality of MFPs. For example, in the area A, the notification signal can be received from all three MFPs 61, 62, and 63. When the environment is set in such a manner that the MFP enables a user to automatically login, the user 10 logs into the MFPs 61 and 63 that are not intended to be used. This compromises the usability of other users, and is not preferable in terms of security.

An MFP according to the present embodiment is configured as follows. Only when the mobile terminal 50 comes within proximity of an MFP to be in a proximity range, i.e., inner one of the concentric circles, the MFP causes a screen of an operation unit to transition to a usable state. Authentication processing completes while the mobile terminal 50 is in the detection range of the MFP, and thus no waiting time for the authentication processing is required for the user in the proximity range. Communications with the mobile terminal 50 can be achieved with the P2P communication module of the MFP provided as an auxiliary device external to the MFP.

Figure 3:
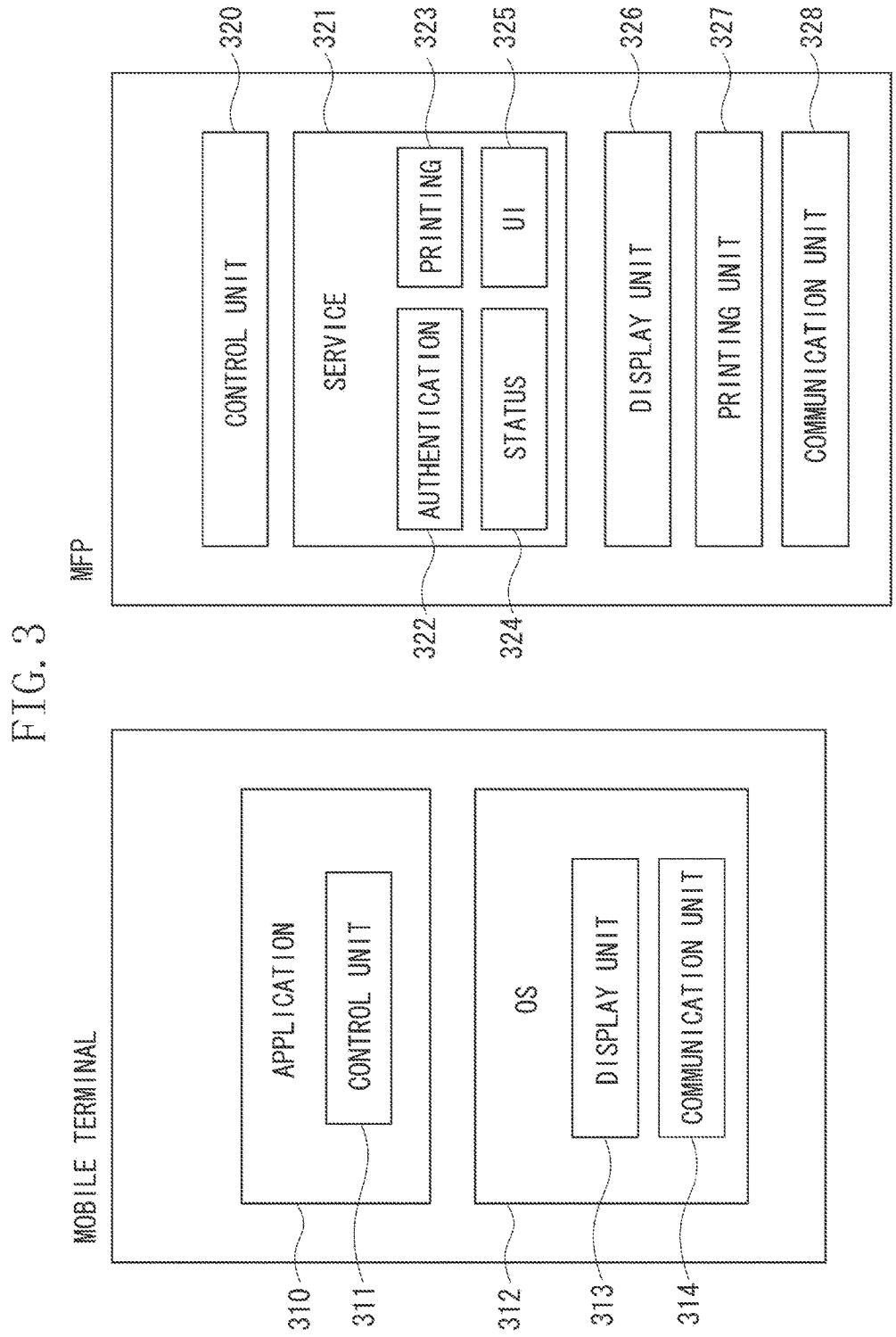
FIG. 3 is a diagram illustrating an example of software configurations of the mobile terminal and the MFP.

FIG. 2 is a diagram illustrating an example of hardware configurations of a mobile terminal and of an MFP. A central processing unit (CPU) 111 of the mobile terminal performs overall control on devices connected to a system bus 121, in accordance with a program stored in a read only memory (ROM) 113 serving as a storage unit. A random access memory (RAM) 112 functions as a main memory, a work area, and the like for the CPU 111. The ROM 113 stores various programs and data. An operation unit interface (I/F) 116 controls input from an operation unit 122, such as a touch panel. A display unit I/F 115 controls display on a display unit 120. An external memory I/F 117 controls an access to an external memory 123, including, for example, a hard disk drive (HDD), a flash memory, or a Solid State Disk (SSD). The external memory 123 functions as a storage medium that information can be stored to and read from, and stores an operating system (OS) and a program for an application. Programs for applications and modules (software), stored in the external memory 123, are loaded onto the RAM 112 and executed by the CPU 111 as appropriate. Thus, functions of an application or each module (software) of the mobile terminal, described below with reference to FIG. 3, are implemented. A communication I/F 118 controls communications using a network interface controller (NIC) 124 and a P2P 125. The NIC 124, serving as a connection I/F for a network, enables connection to the network, and controls data transmission and reception. A configuration for establishing the connection to the network is not limited to that illustrated in FIG. 2. The connection to the network, including a wireless base station, can be established by controlling communications to a mobile network. The P2P 125, serving as a connection I/F for P2P communications, enables P2P connection to be established, and controls connection between devices as well as data transmission and reception. Processing according to the present exemplary embodiment, e.g., information processing illustrated in flowcharts in FIG. 9 and FIG. 10, is implemented with a program stored in the external memory 123, loaded onto the RAM 112 and executed by the CPU 111. The program stored in the external memory 123 can also be stored in the RAM 112 or the ROM 113.

A CPU 141 of the MFP performs overall control on operations performed by the MFP. The CPU 141 performs overall control on devices connected to a system bus 151, in accordance with a program stored in a ROM 143. A RAM 142 functions as a main memory, a work area, and the like for the CPU 141, and is also used as an input information loading area and an environmental data storage area. The ROM 143 stores various fonts, a control program or the like executed by the CPU 141, and various types of data. A communication I/F 148 controls communications using an NIC 164 and a P2P 165. The NIC 164 is a connection I/F for a network, and controls transmission and reception of data to and from, for example, an authentication server, a print sever, and a client terminal. The P2P 165, serving as a connection I/F for P2P communications, enables P2P connection to be established with the mobile terminal, and controls connection between devices and data transmission and reception. The communication I/F 148 is configured with a suitable web service protocol for the target environment. A printer I/F 146 controls an interface for a printing unit 161 serving as an MFP engine. An external memory 163, which is under access control by the external memory I/F 147, includes, for example, an HDD, a flash memory, or an SSD. The CPU 141 loads a program, stored in the external memory 163 or the ROM 143, onto the RAM 142, and executes the program as appropriate to implement the functions of the MFP, such as, for example, a software configuration of the MFP in FIG. 3 described below. An operation unit I/F 145 controls an interface for an operation unit 160 for making various settings on the MFP.

Figure 5:
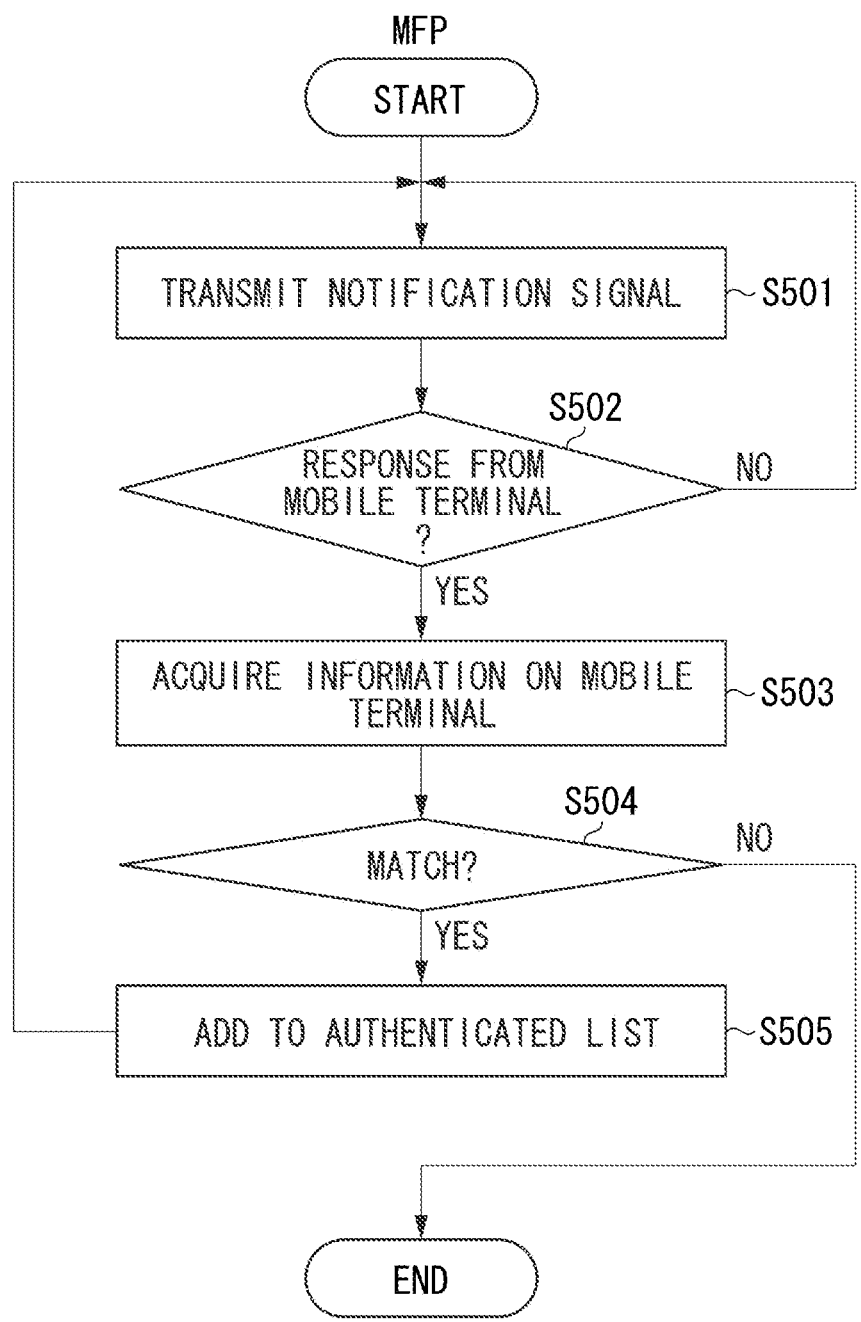
FIG. 5 is a flowchart illustrating a flow of information processing executed by the MFP.
Figure 7:
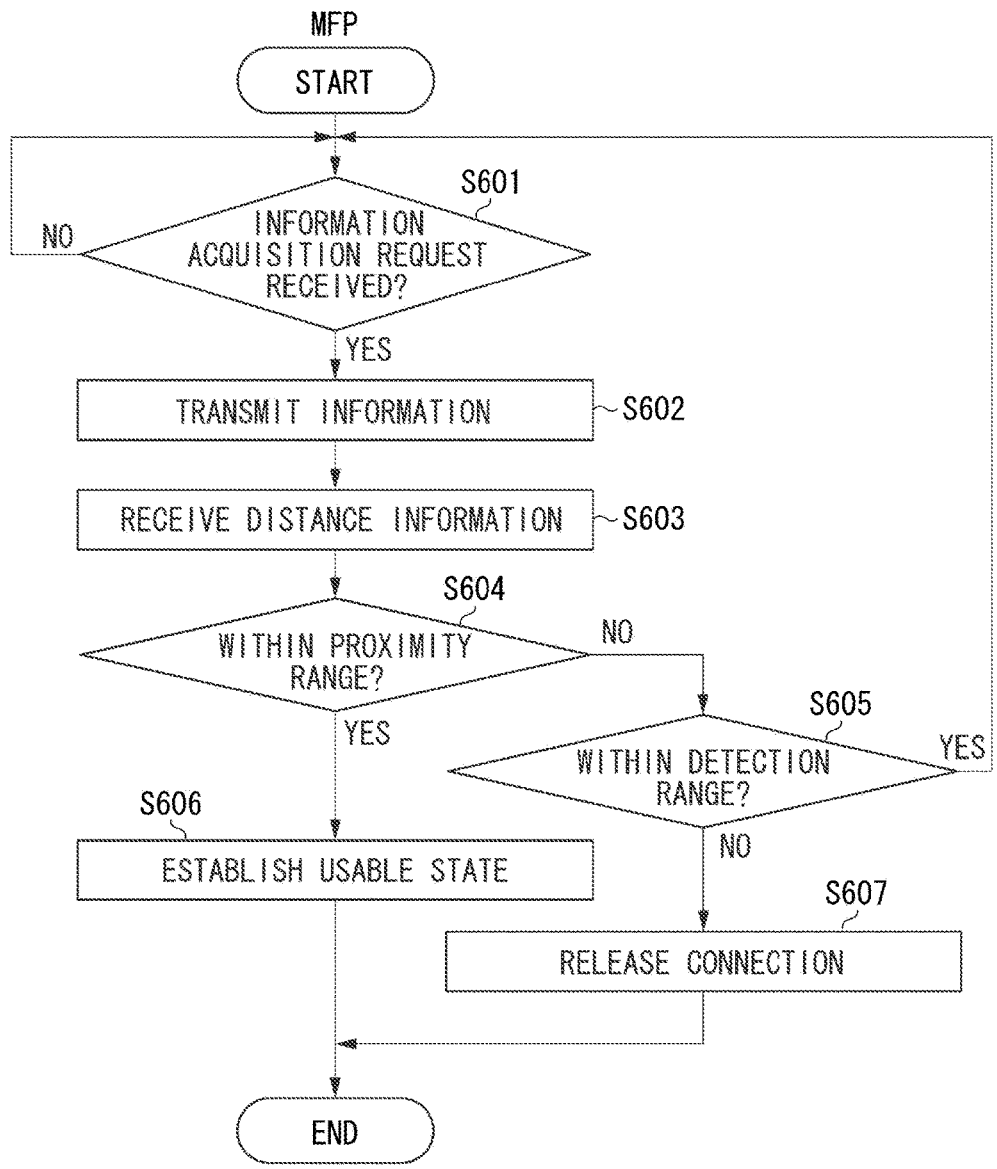
FIG. 7 is a flowchart illustrating a flow of information processing executed by the MFP.

Processing according to the present exemplary embodiment, e.g., information processing illustrated in flowcharts in FIG. 5 and FIG. 7, is implemented with a program, stored in the external memory 163, loaded onto the RAM 142 and executed by the CPU 141. The program stored in the external memory 163 can also be stored in the RAM 142 or the ROM 143.

FIG. 3 is a diagram illustrating an example of software configurations of the mobile terminal 50 and the MFP 62.

An application 310 of the mobile terminal 50 includes a control unit 311. The control unit 311 is loaded to control an operation of the application 310 in the mobile terminal 50. The mobile terminal 50 includes an OS 312 including a display unit 313 and a communication unit 314. The communication unit 314 controls communications performed by the mobile terminal 50. A plurality of types of communications, including mobile communications and P2P communications, performed with the MFP can be controlled. The communication unit 314 also includes a function of storing information required for communications.

A control unit 320 of the MFP controls a printing function of a printing unit 327 provided via the printer I/F 146, and a communication function of a communication unit 328 provided via the communication I/F 148. A print job can be transmitted and received by the mobile terminal 50 and the MFP 62, with the communication unit 314 and the communication unit 328 communicating with each other using a given communication protocol. The communication unit 328 of the MFP also stores authentication information.

The MFP 62 includes a service 321 as a group of functions provided for the mobile terminal 50 via the communication unit 328. The service 321 includes an authentication service 322, a printing service 323, a status service 324, and a user interface (UI) service 325. The MFP 62 provides information on these provided services for the mobile terminal 50. The information includes a type, a capability, and a location (Uniform Resource Identifier (URI)) of the service, and is provided in the above-described notification signal or a response for a request. When the mobile terminal 50 issues a request indicating a desired service to the MFP 62, the control unit 320 of the MFP 62 loads the corresponding service and issues a response to the mobile terminal 50. The control unit 320 of the MFP 62 controls the authentication in accordance with the request for the service 321.

The authentication service 322 provides an authentication function of the MFP 62 for the mobile terminal via the communication unit 328. The authentication service 322 executes and manages authentication processing for logging into the MFP 62. The printing service 323 provides a printing function of the MFP 62 for the mobile terminal 50 via the communication unit 328, and executes and manages printing processing. The printing processing includes issuing, outputting, and canceling a print job. The status service 324 provides a usage status of the MFP 62 for the mobile terminal 50 via the communication unit 328. The UI service 325 provides a UI function of the MFP 62 for the mobile terminal 50 via the communication unit 328. More specifically, the UI service 325 provides UI processing and a UI display screen involving setting, displaying, and instructing for the MFP 62. For example, a UI display after the authentication by the MFP 62, a UI for issuing a print instruction to the MFP 62, and the like are displayed.

Figure 4:
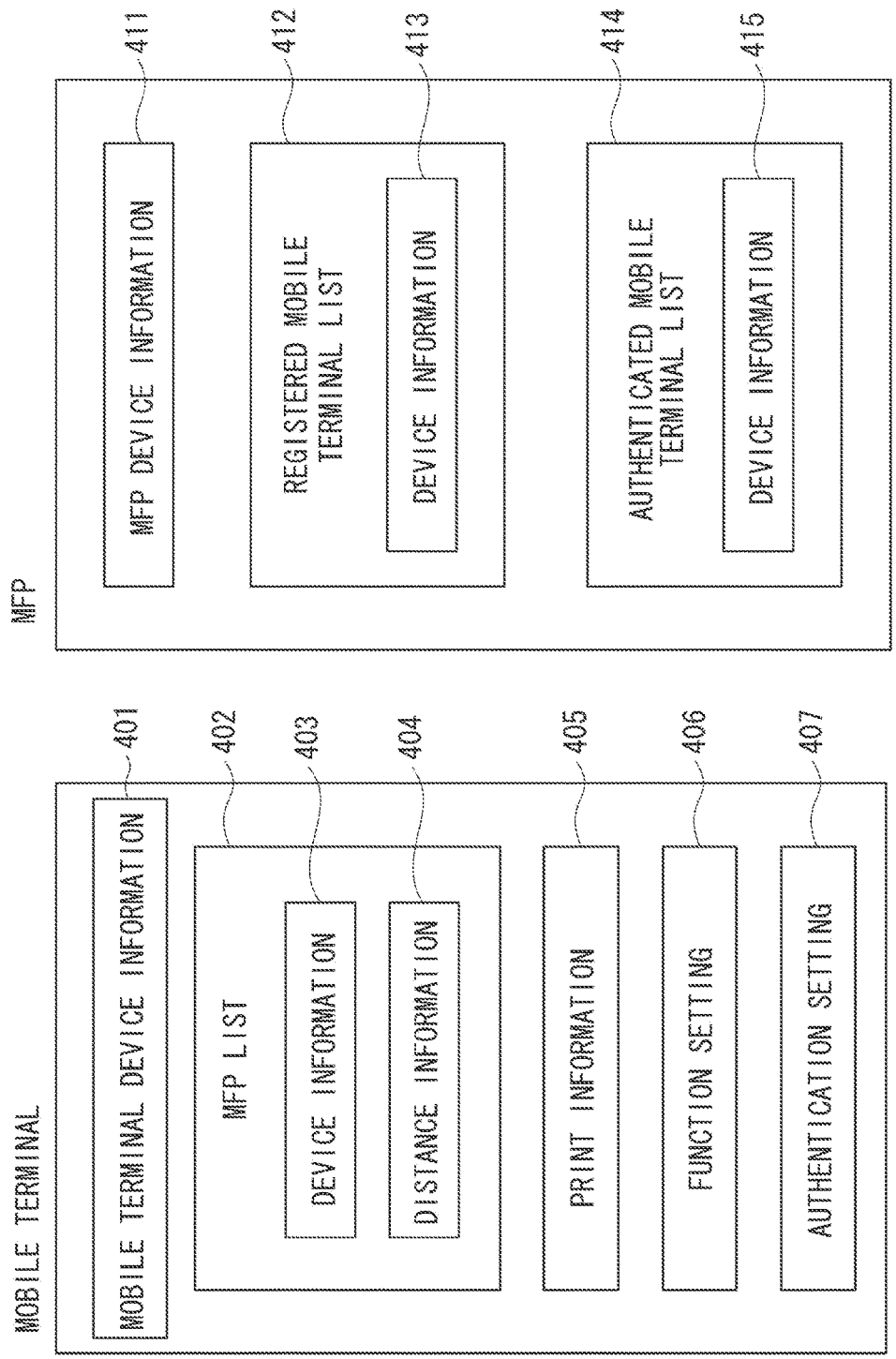
FIG. 4 is a diagram illustrating an example of structures of data held by the mobile terminal and the MFP.

FIG. 4 is a diagram illustrating an example of structures of data stored by the mobile terminal 50 and the MFP 62.

A mobile terminal device information 401 is a universal unique ID (UUID) for identifying the mobile terminal 50 itself, in communications with the MFP 62 and an external line. In the present exemplary embodiment, the mobile terminal 50 transmits a response signal, including the UUID, after receiving a beacon signal from the MFP 62.

An MFP list 402 is a table including a list of information received from an MFP detected by the mobile terminal 50. The list includes device information 403 and distance information 404 that indicates a distance between the mobile terminal 50 and the detected MFP, i.e., MFP 62. The device information 403 includes a UUID, a model name, and service information of the MFP 62. The UUID of the MFP is used as an identifier by the application 310 to identify the target MFP. Print information 405 includes information on a print job to be transmitted to the MFP 62. Function setting 406 and authentication setting 407 include, for example, settings related to the function of the application 310 and settings related to authentication indicating whether automatic login is to be performed.

MFP device information 411 is device information on the MFP 62. The mobile terminal 50 is notified of this information through a response signal for the beacon signal transmitted by the MFP 62 or via scanning performed by the mobile terminal 50. For example, the device information includes the UUID serving as an identifier of the MFP 62, and a model name of the MFP 62 as well as information on services provided by the MFP 62. A registered mobile terminal list 412 is a table used for checking whether the mobile terminal 50 was previously registered when the MFP 62 executes the authentication processing using the UUID of the mobile terminal 50, and includes device information 413, such as a UUID of a mobile terminal. For example, the CPU 141 registers the device information 413, including a UUID of a mobile terminal, in advance based on a registration operation performed by an administrator or the like of the MFP 62 via the operation unit 160. Data such as a Media Access Control (MAC) address that can be used for identifying an object can be used instead of the UUID. The method used to register the information is not seen to be limiting. For example, the information can be distributed from a server in charge of central management of UUIDs to be registered by the CPU 141, instead of being registered in advance by the administer. If the mobile terminal 50 has a UUID registered in the registered mobile terminal list 412, the mobile terminal 50 is successfully authenticated by the MFP 62, and can release the access control of the MFP 62.

An authenticated mobile terminal list 414 is an area used by the MFP 62 to temporarily store the device information 403 when the UUID in the device information 403 received from the mobile terminal 50 is in the registered mobile terminal list 412 that is a list of previously registered UUIDs (successful authentication). A device information 415 that is stored in the authenticated mobile terminal list 414 is deleted by the control unit 320 when a certain period of time elapses after the information has been stored or when the corresponding mobile terminal moves out of the detection range.

In another exemplary embodiment of the authentication using the UUID, the authentication can be performed with the control unit 320 transferring the device information 401, received from the mobile terminal 50, to an independent authentication server. When the authentication is successful, the mobile terminal device information 401, including the UUID of the corresponding mobile terminal, is registered in the authenticated mobile terminal list 414. In such a configuration, the registered mobile terminal list 412 can be omitted.

FIG. 5 is a flowchart illustrating a flow of information processing executed by the MFP 62, including a series of communications with the mobile terminal 50 and the authentication.

In step S501, when no users are logged into the MFP 62, the communication unit 328 periodically transmits a beacon serving as a notification signal (Advertising Packet in Bluetooth low energy).

In step S502, the communication unit 328 determines whether an information request signal (Scanning Packet in Bluetooth low energy) and a connection request signal (Initiating Packet in Bluetooth low energy) have been received from the mobile terminal 50, which received the beacon. In a case where the communication unit 328 determines that the information request signal has been received from the mobile terminal 50 (Yes in step S502), the processing proceeds to step S503. In a case where the information request signal has not been received (No in step S502), the processing returns to step S501.

In step S503, the communication unit 328 transmits the device information 411 including the UUID and the device information on the MFP 62 to the mobile terminal 50. Then, the communication unit 328 establishes a connection with the mobile terminal 50 in response to the connection request signal from the mobile terminal 50. In this processing, the communication unit 328 acquires the mobile terminal device information 401 including the UUID of the mobile terminal 50 in the connection request signal.

In step S504, the control unit 320 matches the acquired mobile terminal device information 401 against the registered mobile terminal list 412, or requests an authentication server to perform the matching. In a case where the control unit 320 finds the matching information (Yes in step S504), the processing proceeds to step S505. When no matching information is found (No in step S504), the processing illustrated in the flowchart in FIG. 5 ends.

In step S505, the control unit 320 stores the mobile terminal device information 401 of the corresponding mobile terminal 50 in the authenticated mobile terminal list 414.

Figure 6:
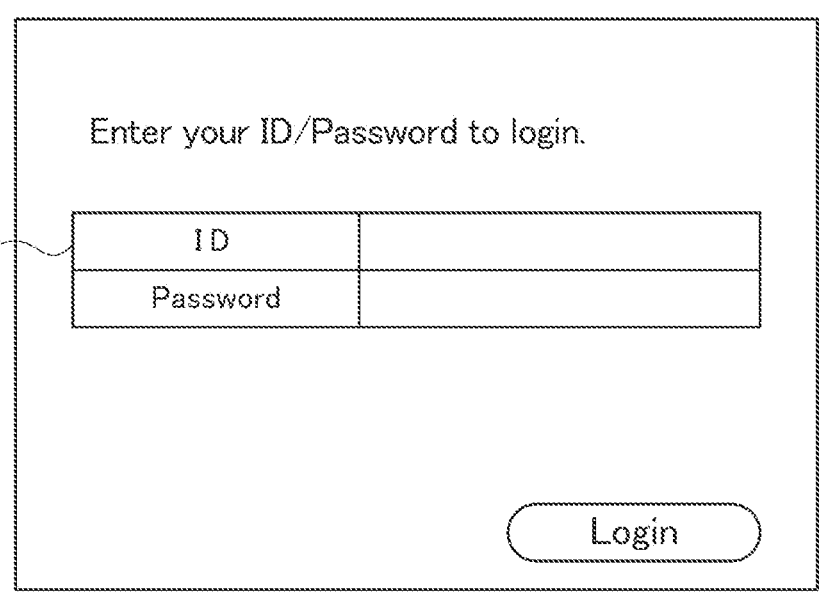
FIG. 6 is a diagram illustrating an example of an input screen of the MFP.

At this point, the MFP 62 is still under the access control (UI lock) set by the user authentication function. Thus, an input screen as illustrated in FIG. 6 is displayed on the operation unit 160 of the MFP 62. The user authentication function can cause the user to input the user's ID and password, as illustrated in an input field 901 in FIG. 6. The user authentication feature can transfer authentication information to the MFP 62 when the user holds the mobile terminal 50 over a port.

FIG. 7 is a flowchart illustrating a flow of information processing executed by the MFP 62. This processing includes processing of releasing the access control (unlock a UI lock) of the MFP 62 as a result of the mobile terminal 50 being in the proximity range of the MFP 62 after the authentication illustrated in FIG. 5.

The communication unit 314 of the mobile terminal 50 and the communication unit 328 of the MFP 62 continue to periodically transmit and receive signals to and from each other after the above-described authentication processing. Thus, the connected state is maintained and the distance information can be provided.

In step S601, the communication unit 328 determines whether an information acquisition request has been received from the mobile terminal 50. In a case where the communication unit 328 determines that the information acquisition request has been received from the mobile terminal 50 (Yes in step S601), the processing proceeds to step S602. In a case where the information acquisition request is determined not to have been received (No in step S601), the processing in step S601 is repeated.

In step S602, the communication unit 328 transmits information requested by the mobile terminal 50. In step S603, the communication unit 328 receives, from the mobile terminal 50, distance information that indicates a distance between the mobile terminal 50 and the MFP 62.

In step S604, the control unit 320 determines whether a value of the distance information received by the communication unit 328 is less than or equal to a threshold of a set proximity range. In a case where the value of the distance information received by the communication unit 328 is less than or equal to the threshold of the set proximity range, the control unit 320 determines that the mobile terminal 50 is within the proximity range. In a case where the value of the distance information received by the communication unit 328 is greater than the threshold of the set proximity range, the control unit 320 determines that the mobile terminal 50 is outside the proximity range. In a case where the control unit 320 determines that the mobile terminal 50 is within the proximity range (Yes in step S604), the processing proceeds to step S606. In a case where the mobile terminal 50 is determined to be outside the proximity range (No in step S604), the processing proceeds to step S605. In step S605, the control unit 320 determines whether the value of the distance information received by the communication unit 328 is less than or equal to a threshold of a set detection range. In a case where the value of the distance information received by the communication unit 328 is less than or equal to the threshold of the set detection range, the control unit 320 determines that the mobile terminal 50 is within the detection range. In a case where the value of the distance information received by the communication unit 328 is greater than the threshold of the set detection range, the control unit 320 determines that the mobile terminal 50 is outside the detection range. In a case where the control unit 320 determines that the mobile terminal 50 is within the detection range (Yes in step S605), the processing returns to step S601. In a case where the mobile terminal 50 is determined to be outside the detection range (No in step S605), the processing proceeds to step S607.

Figure 8:
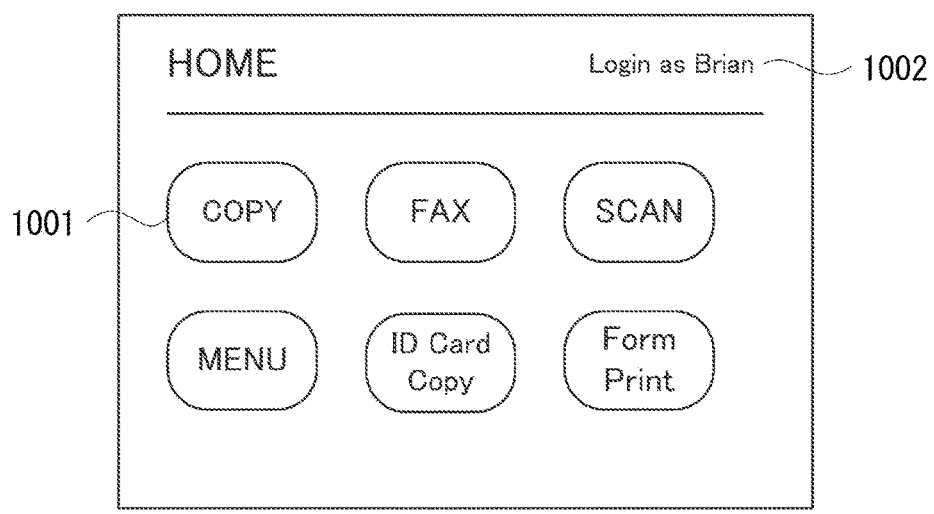
FIG. 8 is a diagram illustrating an example of a HOME screen of the MFP.

In step S606, the control unit 320 unlocks the screen of the operation unit 160 and instructs the operation unit 160 to transition the screen to a state where the user of the mobile terminal 50 can use the MFP 62 via a display unit 326. FIG. 8 illustrates an example of a screen in the state where the MFP 62 is usable by the user of the mobile terminal 50. More specifically, FIG. 8 illustrates an example of a HOME screen of the MFP 62. The HOME screen is a default screen of the MFP 62 displayed upon successful authentication with appropriate user information or when the authentication function is OFF. The HOME screen includes buttons for regular functions, such as COPY 1001, FAX, and SCAN, as well as buttons for expanded functions, such as an ID Card Copy and Form Print. The buttons are examples of an object related to functionality provided by the MFP 62. When the authentication is successful with appropriate user information, the display unit 326 can display the name of the logged in user on the HOME screen, as illustrated in an area 1002. Then, the processing illustrated in the flowchart in FIG. 7 ends.

In step S607, the control unit 320 determines that the user of the mobile terminal 50 has moved out of the detection range, and transmits a connection release request to the mobile terminal 50 so that the connection with the mobile terminal 50 is released. Then, the control unit 320 deletes the information on the mobile terminal 50 from the authenticated mobile terminal list 414. The processing illustrated in the flowchart in FIG. 7 then ends.

At the point where the MFP 62 unlocks the screen of the operation unit 160 in step S606, the authentication processing on the mobile terminal 50 has already completed. Thus, the MFP 62 can immediately transition to the usable state when the user, who has moved into the proximity range, is in front of the MFP 62, and thus does not make the user wait. The detection range can be set to be relatively large. Also in such a condition, the operation unit 160 is not unlocked until the mobile terminal 50 that was successfully authenticated moves into the proximity range. Thus, even in environment with a relatively large detection range, there is no risk of executing unintended authentication processing that can hinder use of the MFP 62 other users and is a low security risk as well.

In the present exemplary embodiment, the MFP 62 receives the distance information from the mobile terminal 50, and determines whether the mobile terminal 50 is within the proximity range/detection range. Alternatively, for example, the control unit 311 of the application 310 of the mobile terminal 50 can evaluate the distance information and notify the MFP 62 of the result of determining whether the mobile terminal 50 is within the proximity range or within the detection via the communication unit 314 of the OS 312. In such a configuration, the control unit 320 of the MFP 62 determines whether the mobile terminal 50 is within the proximity range or within the detection range based on provided determination result.

Master/slave relationship in Bluetooth low energy can be reversed once the authentication processing is completed in FIG. 5. More specifically, the MFP 62 can measure the distance information based on the beacon signal received from the mobile terminal 50, and determine whether the mobile terminal 50 is within the proximity range/detection range.

FIG. 9 and FIG. 10 are flowcharts each illustrating a flow of information processing executed by the mobile terminal 50 in response to the processing executed by the MFP 62 described with reference to FIG. 5 and FIG. 7.

In step S701 in FIG. 9, the control unit 311 of the mobile terminal 50 determines whether the notification signal, which is the beacon, has been received from the MFP 62 via the communication unit 314. In a case where the control unit 311 determines that the notification signal has been received (Yes in step S701), the processing proceeds to step S702. In a case where the notification signal has not been received (No in step S701), the processing in step S701 is repeated.

In step S702, the control unit 311 communicates with the MFP 62 via the communication unit 314 and receives device information, including a UUID.

In step S703, the control unit 311 adds the device information on the MFP 62 to the MFP list 402.

In step S801 in FIG. 10, the control unit 311 performs scanning based on the device information on an MFP registered in the MFP list 402 by transmitting a signal and the like to the corresponding MFP.

In step S802, the control unit 311 calculates the distance information indicating the distance between the mobile terminal 50 and the MFP based on a response signal transmitted from the MFP in response to the scanning. More specifically, the control unit 311 calculates the distance information by, for example, applying a value of field intensity of the response signal received from the MFP to a transmission equation. The control unit 311 updates the information in the MFP list 402, and notifies the MFP of the distance information thus calculated. The control unit 311 executes this series of processing on all the MFPs registered in the MFP list 402.

The control unit 320 of the MFP notified of the distance information calculated by the control unit 311 determines that the mobile terminal 50 is "within the proximity range" in a case where the value of the distance information is less than or equal to the threshold of the set proximity range as described above. Similarly, the control unit 320 determines that the mobile terminal 50 is "within the detection range", in a case where the value of the distance information is less than or equal to the threshold of the set detection range. In the present exemplary embodiment, the proximity range is assumed to be a range between approximately 0.5 m to 1 m, and the detection range is assumed to be a range between approximately 5 m and 10 m.

The control unit 311 of the mobile terminal 50 can evaluate the distance information based on the field intensity of a signal received from the MFP. For example, the control unit 311 can notify the MFP of the result of determining whether the mobile terminal 50 is within the proximity range under a condition that the mobile terminal 50 is determined to be "within the proximity range" in a case where the field intensity of the received signal exceeds a certain threshold.

Upon receiving the connection release request in step S607 in FIG. 7 from the MFP, the control unit 311 of the mobile terminal 50 deletes the device information on the corresponding MFP from the MFP list 402. This processing can also be executed in a case where the control unit 311, using the distance information calculated in step S802 to determine whether the mobile terminal 50 is within the detection range of the MFP, determines that the mobile terminal 50 is outside the detection range.

The processing according to the above-described exemplary embodiment achieves both usability and security.

Other Embodiments

Embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)TM), a flash memory device, a memory card, and the like.

While exemplary embodiments have been described, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-218192, filed Nov. 8, 2016, which is hereby incorporated by reference herein in its entirety.

What is claimed is:

1. An information processing apparatus capable of communicating with a mobile terminal in accordance with a predetermined wireless communication protocol, comprising:
    an operation unit including a screen operable by a user;
    a memory device that stores a set of instructions; and
    at least one processor that executes the set of instructions to:
        receive identification information used for authenticating the mobile terminal from the mobile terminal in accordance with the predetermined wireless communication protocol;
        cause an authentication processing to authenticate the mobile terminal based on the received identification information;
        receive predetermined information from the mobile terminal in accordance with the predetermined wireless communication protocol after the authentication processing successfully authenticates the mobile terminal, to determine to shift the screen of the operation unit into a logged-in state in a case where a distance between the mobile terminal and the information processing apparatus is within a set range; and
        shift the screen of the operation unit into the logged-in state based on the received predetermined information.

2. The information processing apparatus according to claim 1,
    wherein the at least one processor executes the set of instructions to execute the authentication processing, and
    to store information of the mobile terminal that has been successfully authenticated by the authentication processing.

3. The information processing apparatus according to claim 1, wherein the at least one processor executes the set of instructions to:

receive distance information, from the mobile terminal, indicating a distance between the mobile terminal and the information processing apparatus after the authentication processing successfully authenticates the mobile terminal;

determine whether the distance between the mobile terminal and the information processing apparatus is within the set range based on the received distance information; and shift, in a case where the distance is determined to be within the set range, the screen of the operation unit into the logged-in state.

4. The information processing apparatus according to claim 1, wherein the at least one processor executes the set of instructions to:

obtain distance information, from the mobile terminal, indicating a distance between the mobile terminal and the information processing apparatus after the authentication processing successfully authenticates the mobile terminal;

determine whether the distance between the mobile terminal and the information processing apparatus is within the set range based on the obtained distance information; and shift, in a case where the distance is determined to be within the set range, the screen of the operation unit into the logged-in state.

5. The information processing apparatus according to claim 1, wherein the at least one processor executes the set of instructions to:

receive, from the mobile terminal, a result of determining whether the distance between the mobile terminal and the information processing apparatus is within the set range after the authentication processing successfully authenticates the mobile terminal; and shift, in a case where the result of the determining indicates that the distance between the mobile terminal and the information processing apparatus is within the set range, the screen of the operation unit into the logged-in state.

6. The information processing apparatus according to claim 1, wherein the at least one processor executes the set of instructions to shift, in a case where the distance between the mobile terminal and the information processing apparatus is within the set range, the screen of the operation unit into the logged-in state by unlocking the screen and displaying an object related to a function provided by the information processing apparatus on the screen.

7. The information processing apparatus according to claim 6, wherein the at least one processor executes the set of instructions to perform control so that identification information of the user of mobile terminal currently logged into the information processing apparatus is displayed on the screen.

8. The information processing apparatus according to claim 1, wherein the at least one processor executes the set of instructions to shift the screen of the operation unit into the logged-in state, when determining that the distance between the mobile terminal and the information processing apparatus is within the set range after receiving the authentication information.

9. The information processing apparatus according to claim 1, wherein the screen of the operation unit of the logged-in state enables a login user to select, via the screen of the operation unit, a function to be executed by the information processing apparatus.

10. The information processing apparatus according to claim 1, wherein the screen of the operation unit of the logged-in state can display a plurality of functions to be selected by a login user.

11. The information processing apparatus according to claim 1, wherein the at least one processor that executes the set of instructions to:

broadcast a packet in accordance with the predetermined wireless communication protocol;

receive, as a response to the broadcasted packet, the identification information used for authenticating the mobile terminal from the mobile terminal in accordance with the predetermined wireless communication.

12. The information processing apparatus according to claim 1, wherein the broadcasted packet is an advertising packet of BLE (Bluetooth Low Energy).

13. The information processing apparatus according to claim 1, wherein the predetermined information is distance information indicating the distance between the mobile terminal and the information processing apparatus derived by the mobile terminal.

14. The information processing apparatus according to claim 1, wherein the at least one processor that executes the set of instructions to determine, based on the predetermined information received after the mobile terminal is successfully authenticated by the received identification information, whether to shift the screen of the operation unit into the logged-in state, wherein the shifting of the screen is performed based on the determination.

15. The information processing apparatus according to claim 1, the predetermined information is transmitted by the mobile terminal in a case where a distance between the mobile terminal and the information processing apparatus is within the set range.

16. The information processing apparatus according to claim 1, wherein the predetermined wireless communication protocol is a BLE (Bluetooth Low Energy), and the identification information is a UUID (universally unique identifier) of the mobile terminal.

17. The information processing apparatus according to claim 1, wherein a distance between the mobile terminal and the information processing apparatus when the identification information is received is greater than a distance between the mobile terminal and the information processing apparatus when the predetermined information is received.

18. The information processing apparatus according to claim 1, wherein the predetermined information is different from the identification information and used for determining to shift the screen of the operation unit into the logged-in state.

19. An information processing method for controlling an information processing apparatus including an operation unit, the information processing method comprising:

receiving, by the information processing apparatus, identification information used for authenticating the mobile terminal from the mobile terminal in accordance with a predetermined wireless communication protocol;

performing authentication processing to authenticate the mobile terminal based on the received identification information;

receiving, by the information processing apparatus, predetermined information from the mobile terminal in accordance with the predetermined wireless communication protocol after the authentication processing successfully authenticates the mobile terminal, to determine to shift a screen of the operation unit into a logged-in state in a case where a distance between the mobile terminal and the information processing apparatus is within a set range; and shifting, by the information processing apparatus, the screen of the operation unit into the logged-in state based on the received predetermined information.

* * * * *